Oct. 30, 1934.          H. W. DRAKE          1,978,742
                        HYDRAULIC BRAKE
                    Filed June 20, 1933          3 Sheets-Sheet 1
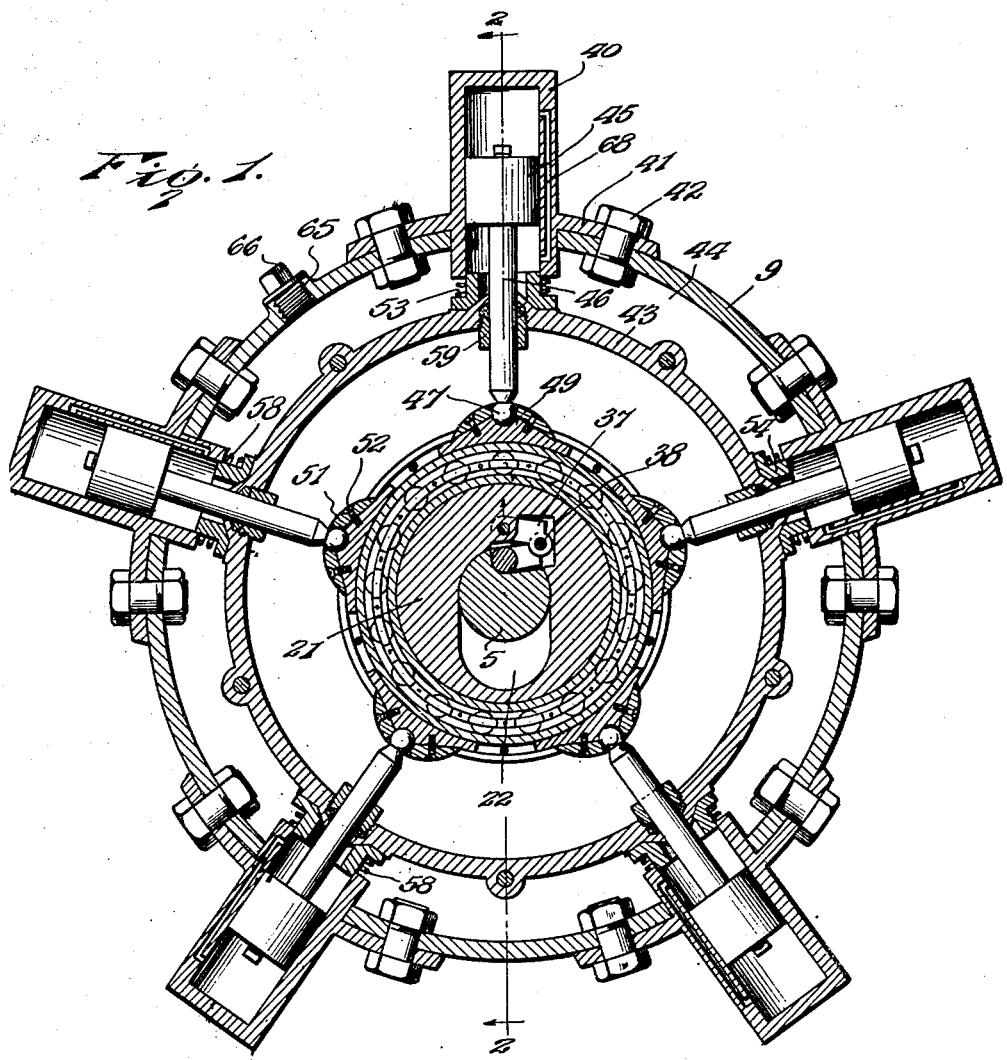
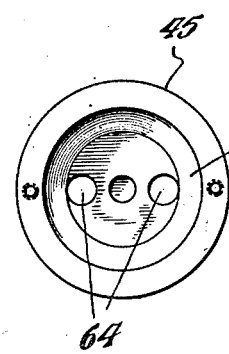
Inventor
H. W. Drake.
By Lacey & Lacey,
Attorneys

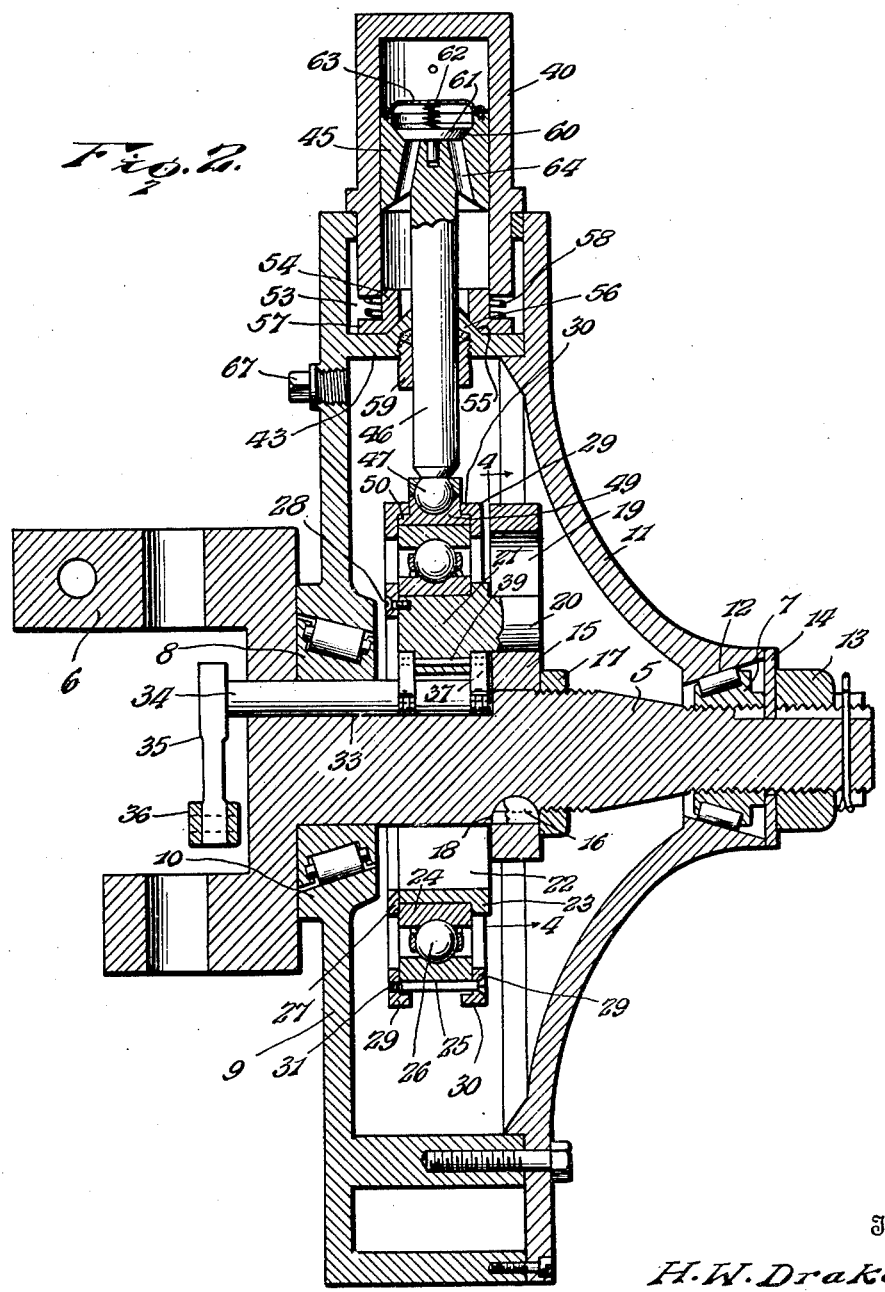

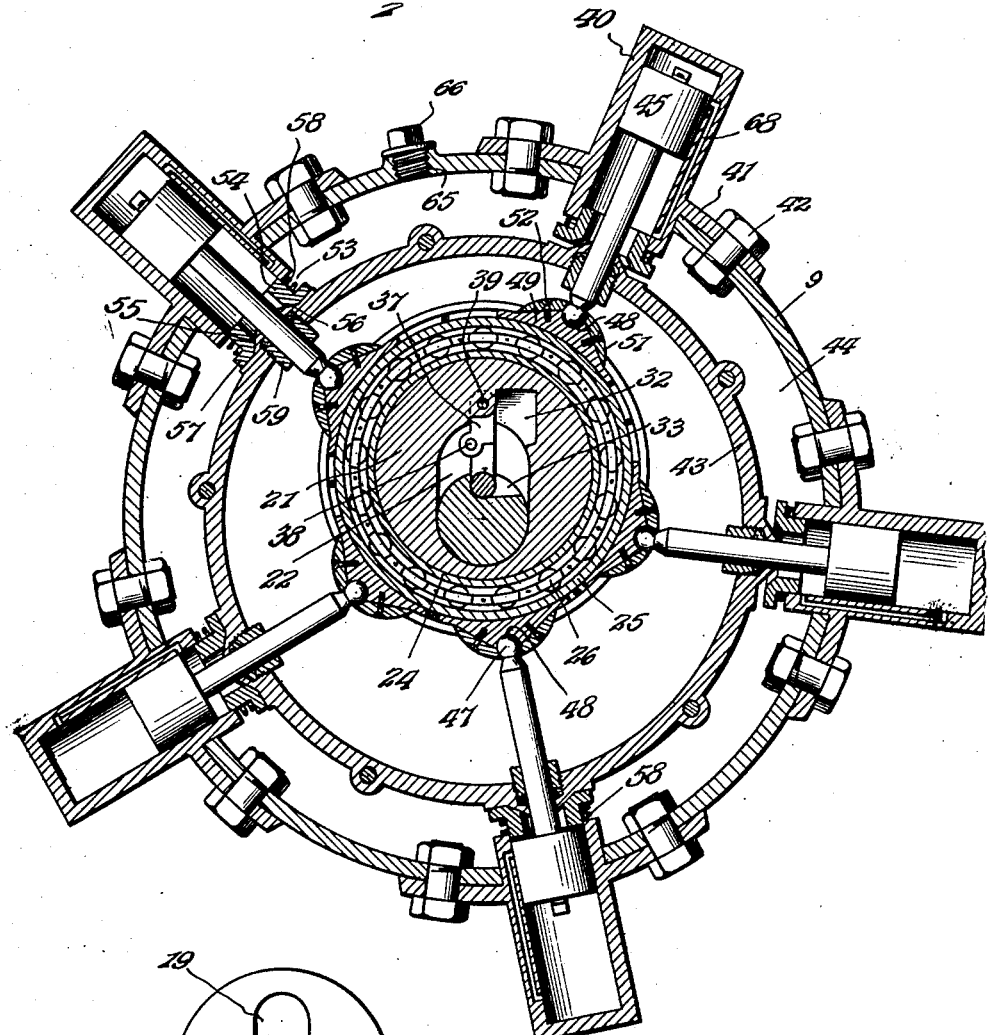

Patented Oct. 30, 1934

1,978,742

UNITED STATES PATENT OFFICE 1,978,742

HYDRAULIC BRAKE

Harry W. Drake, Marshall, Ill.

Application June 20, 1933, Serial No. 676,734

11 Claims. (Cl. 188—91)

This invention relates to vehicle brakes and more particularly to hydraulic brakes for automobiles and other power operated conveyances.

The object of the invention is to provide a hydraulic brake of durable and economical construction in which fluid under pressure is utilized to effect the braking action on the vehicle wheels and which will effectually prevent dragging or grabbing of the wheels when the brakes are applied.

A further object of the invention is to provide a hydraulic brake including a stationary member mounted on the axle spindle and having a vertically adjustable eccentric cooperating therewith and to which are connected a plurality of radially disposed fluid operated pistons provided with bearing shoes normally movable over the eccentric, means being provided, operable from the brake pedal, for shifting the position of the eccentric with respect to the spindle whereby to cause the shoes to coact with the eccentric and prevent rotation of the wheel.

A further object is to provide a hydraulic brake which will neither freeze up or overheat and in which the active elements thereof are submerged in oil, thereby causing the brake to effectually operate for an indefinite period without the need of adjustment or renewal of parts.

A still further object of the invention is generally to improve this class of devices so as to increase their utility, durability and efficiency.

In the accompanying drawings forming a part of this specification:

Figure 1 is a vertical sectional view of a hydraulic brake embodying the present invention, showing the parts in neutral position so as to permit free rotation of the vehicle wheel.

Figure 2 is a vertical transverse sectional view taken on the line 2—2 of Figure 1.

Figure 3 is a view similar to Figure 1, showing the eccentric elevated and the operating parts in braking position.

Figure 4 is a detail vertical sectional view taken on the line 4—4 of Figure 2.

Figure 5 is a top plan view of the piston with the valve removed.

Similar numerals of reference indicate corresponding parts in all the figures of the drawings.

The improved hydraulic brake forming the subject matter of the present invention is particularly designed for application to the wheels of automobiles and similar motor driven conveyances and by way of illustration is shown in connection with the front wheel of an automobile in which 5 designates the spindle, 6 the knuckle, and 7 and 8 the front and rear bearings which may be of standard construction.

Mounted for rotation on the spindle is a substantially circular casing or housing 9 having its rear portion inclined inwardly and downwardly at 10 for engagement with the bearing 8 and its front portion closed by a hub plate 11 to which the automobile wheel may be secured in any suitable manner. The hub plate 11 at the front thereof is also preferably inclined inwardly and downwardly at 12 for contact with the front bearing 7, and a nut 13 is threaded on the spindle and bears against a washer 14 which, in turn, engages the adjacent portion of the hub plate, as shown, so that the housing and wheel are free to rotate on the spindle in the usual manner.

Disposed within the housing is a stationary eccentric guide 15 which is made fast to the spindle by a key or spline 16 and, if desired, a lock nut 17 may be threaded on the spindle so as to force the eccentric guide against a shoulder 18 on the spindle at the rear of the guide and thus assist in preventing displacement of the eccentric guide on the spindle. The upper portion of the guide plate 15 is provided with a vertically disposed slot 19 which receives a guide pin or lug 20 carried by a vertically adjustable eccentric 21 arranged at the rear of the eccentric guide, as best shown in Figure 2 of the drawings. The adjustable eccentric is provided with a vertical slot or opening 22 so as to permit adjustment of the eccentric with respect to the spindle, said eccentric being guided in its vertical movement by the lug 20 engaging the walls of the slot 19 in the guide member 15. The eccentric is provided with a peripheral bead 23 and bearing against said bead is a stationary inner race member or ring 24, there being a movable outer race member or ring 25 coacting therewith and between which are interposed anti-friction balls 26. The inner stationary race member 24 is held in position by a retaining ring 27 which coacts with the bead 23 and is secured to the eccentric by bolts or similar fastening devices 28. Disposed on opposite sides of the outer or movable race member 25 are coacting rings 29 connected at spaced intervals by bolts 31 and provided with inwardly projecting retaining lips 30. The eccentric 21 is cut away to form a chamber 32 and the upper surface of the spindle 5 is provided with a recess 33 in which is seated an operating rod 34 having a terminal crank 35 to the lower end of which is connected a brake rod 36 leading to the usual brake pedal, not shown. The recesses 32 and 33 accommodate a pair of toggle levers 37 having their inner ends pivotally connected at 38, the outer end of the upper lever being pivotally connected at 39 to the eccentric and the outer end of the lower lever being pivotally connected with the spindle 5 at the recess 33. The inner end of the operating rod 34 is connected with the toggle levers so that when the foot brake pedal is depressed a rocking movement will be imparted to the operating rod 34 which will, in turn, straighten out the links of the toggle and thus adjust the eccentric vertically with respect to the spindle.

Extending radially from the housing at predetermined spaced intervals are fluid pressure cylinders 40 having lateral attaching flanges 41 which bear against the periphery of the housing 9 and are rigidly secured thereto by bolts 42. Spaced inwardly from the outer wall of the housing 9 and disposed concentric therewith is a circular partition 43 defining an intermediate chamber 44 adapted to receive oil or other fluid. Mounted for reciprocation in the cylinders 40 are piston heads 45 having piston rods 46 depending therefrom and provided with spherical heads 47 which fit in correspondingly shaped sockets 48 formed in bearing shoes 49. The bearing shoes 49 are provided with lateral flanges 50 which fit beneath the lips 30 and serve to guide the shoes on the outer or movable race member 25 as well as to connect the pistons with the eccentric and insure a positive return stroke of each piston. The shoes 49 have a limited sliding movement on the outer race member of the eccentric and the spherical heads of the piston rods are retained in the sockets of the shoes by plates 51 detachably secured to the shoes by screws 52. The inner end of each cylinder 40 terminates in spaced relation to the partition or ring 43 to form annular ports 53 and slidably mounted in the lower ends of the cylinders at said ports are valves 54 having their lower faces dished or tapered at 55 and adapted to engage correspondingly tapered valve seats 56 formed on the partition 43. The valves 54 are provided with cylindrical portions which engage the inner walls of the cylinders and at their lower ends are formed with annular flanges 57 between which and the adjacent ends of the cylinders are disposed coil springs 58 which tend to normally hold the valves to their seats. Fitted in the partition 43 at each piston rod 46 is a gland or packing 59 which serves to prevent leakage of oil or other fluid from the chamber 44 into the housing. The upper ends of the piston heads are provided with tapered valve seats 60 which receive disc valves 61, the valves 61 being retained to their seats by coil springs 62 interposed between the valves and a retaining cross bar 63 secured to the upper end of the adjacent piston head, as shown. The piston heads 45 are provided with downwardly inclined ports 64 which form a source of communication between the opposite sides of the heads and permit the oil or other fluid in the lower portion of the cylinders to flow through the ports to the upper ends of the cylinders on the down stroke of the pistons, it being understood, of course, that on the down stroke of the pistons the valves 61 will open against the tension of the springs 62 to permit the passage of said oil. The walls of the cylinders 40 are provided with relatively small longitudinal liquid passages or bypasses 68, the opposite ends of which open into the cylinders near the upper and lower ends thereof.

Oil or other fluid may be introduced into the chamber 44 through a filling opening 65 by removing a threaded plug 66 and grease or other lubricant may be introduced within the housing through an opening in the rear end thereof by removing a similar closure plug 67.

Under normal conditions the parts assume the position shown in Figure 1 of the drawings and as the adjustable member 21 is concentric with the longitudinal axis of the spindle 5, the housing, hub plate with the wheel secured thereto, and cylinders are all free to rotate as a unit about said member 21 and, of course, no braking action will take place, as the outer race member, to which the piston rods 46 are connected, simply rolls around the inner race member, as will be readily understood. When it is desired to apply the brakes, the rod 34 is rocked in any suitable manner, as by depressing the foot brake pedal, which causes the toggle links to straighten out or partially straighten out, according to the amount of pressure exerted on the foot pedal. As the toggle links straighten out they will move the eccentric 21 vertically of the spindle and said eccentric will be guided in its upward movement by the lug 20 operating in the slot 19 of the guide plate. As the eccentric moves upwardly under the influence of the toggle levers the pistons 45 at the top of the housing will be forced outwardly and the suction created by the pistons will elevate the valves 54 against the tension of the springs 58 so as to permit oil from the chamber 44 to enter the lower portions of the cylinders through the ports 53 and said valves. As the pistons start back the valves 54 in the bottom of the cylinders close and the valves 61 in the piston heads open, thus permitting the oil to flow through the ports 64 to the top of the cylinders. As the piston heads 45 move upwardly or outwardly the oil at the outer ends of the pistons will be forced through the passages 68 to the lower ends of the cylinders. Only so much oil can escape in a given length of time under a given pressure through the channels or passages 68 and consequently the further the brake pedal is forced down the longer the stroke of the pistons and the greater the amount of oil which must be disposed of through these passages 68 before the bearing shoes of the piston rods can pass over the top of the eccentric. When the brake pedal is forced all the way down, the pistons have to make a full stroke from the bottom to the top of the cylinders and after the piston heads pass the upper ends of the passages 68 further movement thereof is impossible due to the oil between the piston heads and the adjacent ends of the cylinders and as there is now no outlet or escape for this oil the bearing shoes 49 cannot pass over the high point of the eccentric and a braking action will be exerted on the outer race member thereby to automatically stop further rotation of the vehicle wheel. When the brake pedal is released the eccentric centers itself, that is to say, moves from the position shown in Figure 3 of the drawings to the position shown in Figure 1 and in which position the toggle levers will be housed within the recess 32 and 33 and the housing with the wheel attached thereto free to rotate about the spindle, as will be readily understood. While the hydraulic brake mechanism is shown applied to the front spindle of an automobile it will be understood that, if desired, the rear axle housing may extend into the brake and serve in the same capacity as the spindle with regard to the braking mechanism on the front wheels.

Having thus described the invention, what is claimed is:

1. In a hydraulic brake, the combination with a wheel spindle, of a housing mounted for rotation on the spindle, an eccentric disposed within the housing and adjustable radially of the spindle, fluid pressure pistons carried by the housing and engaging the eccentric, and toggle levers forming a connection between the spindle and the eccentric for adjusting the latter whereby to cause the pistons to exert a braking action on said eccentric.

2. In a hydraulic brake, the combination with a wheel spindle, of a housing mounted for rotation on the spindle and provided with a fluid receiving chamber, an eccentric disposed within the housing and adjustable radially of the spindle, cylinders carried by the housing and communicating with the fluid chamber, fluid pressure pistons operating within the cylinders and acting on the eccentric, means for controlling the flow of fluid from the chamber to said cylinders, toggle levers forming a connection between the spindle and eccentric and means operatively connected with the toggle levers for adjusting the eccentric whereby to cause the pistons to exert a braking action on said eccentric.

3. In a hydraulic brake, the combination with a wheel spindle, of a housing mounted for rotation on the spindle, a guide plate disposed within the housing and provided with a slot, an adjustable eccentric fitting around the spindle and provided with a lateral lug operating in the guide slot, fluid pressure cylinders carried by the housing, pistons operating within the cylinders and engaging the eccentric, toggle levers forming a connection between the spindle and said eccentric, and means operatively connected with the toggle levers for adjusting the eccentric vertically with respect to the spindle whereby to cause the pistons to exert a braking action on the eccentric.

4. In a hydraulic brake, the combination with a wheel spindle, of a housing mounted for rotation on the spindle, a slotted guide plate disposed within the housing and rigidly secured to the spindle, an eccentric adjustable radially of the spindle and provided with a lateral lug operating in the slot of the guide plate, said eccentric being provided with inwardly extending flanges, fluid pressure cylinders carried by the housing, pistons operating within the cylinders and provided with rods having terminal shoes fitting beneath the flanges, and means operatively connected with the spindle and eccentric for adjusting the eccentric vertically with respect to the spindle whereby to cause the pistons to exert a braking action on the eccentric.

5. In a hydraulic brake, the combination with a wheel spindle, of a housing mounted for rotation on the spindle, a slotted guide plate disposed within the housing and rigidly secured to the spindle, an eccentric surrounding the spindle and adjustable radially thereof, said eccentric being provided with a lateral lug operating in the slot of the guide plate, relatively stationary and movable race members carried by the eccentric, anti-friction balls interposed between the race members, the movable race member being provided with inwardly extending flanges, fluid pressure cylinders carried by the housing, valved pistons operating within the cylinders and provided with terminal shoes fitting beneath the flanges of the movable race member, toggle members connected with the eccentric and spindle respectively, and means connected with the toggle levers for actuating the same to adjust the eccentric vertically of the spindle and cause the pistons to exert a braking action on the eccentric.

6. In a hydraulic brake, the combination with a wheel spindle, of a housing mounted for rotation on the spindle, a stationary slotted guide plate disposed within the housing and secured to the spindle, an adjustable eccentric surrounding the spindle and provided with a guide lug fitting in the slot in the plate, said eccentric and spindle being cut away to form recesses, toggle levers seated in said recesses and pivotally connected with the eccentric and spindle respectively, radially disposed fluid pressure cylinders carried by the housing, pistons operating within the cylinders and provided with terminal shoes contacting with the eccentric, a rock shaft connected with the toggle levers, and means connected with the rock shaft for operating the toggle levers to adjust the eccentric vertically of the spindle whereby to cause the pistons to exert a braking action on the eccentric.

7. In a hydraulic brake, the combination with a wheel spindle, of a housing mounted for rotation on the spindle and provided with an oil receiving chamber, a stationary guide plate disposed within the housing and secured to the spindle, an adjustable eccentric coacting with the guide plate, radial fluid pressure cylinders carried by the housing and communicating with the oil chamber, spring pressed valves controlling the flow of oil from the chamber to the cylinders, valved pistons operating within the cylinders and provided with terminal shoes bearing against the eccentric, and means operatively connected with the eccentric for adjusting the eccentric vertically of the spindle whereby to cause the pistons to exert a braking action on the eccentric.

8. In a hydraulic brake, the combination with a wheel spindle, of a housing mounted for rotation on the spindle and provided with an oil chamber, radial fluid pressure cylinders carried by the housing and communicating with the oil chamber, valves for controlling the flow of oil from the chamber to the cylinders, valved pistons operating within the cylinders, the walls of said cylinders being provided with a fluid bypass opening at the opposite ends of the cylinders, a slotted guide plate secured to the spindle, an eccentric adjustable radially of the spindle and coacting with the guide plate, said eccentric being provided with inwardly extending peripheral flanges, piston rods connected with the pistons and provided with terminal shoes fitting beneath said flanges, toggle levers pivotally connected with the spindle and eccentric, and means operatively connected with the toggle levers for adjusting the eccentric vertically of the spindle whereby to cause the pistons to exert a braking action on the eccentric.

9. In a hydraulic brake, the combination with a wheel spindle, of a housing mounted for rotation on the spindle and provided with an oil chamber, an eccentric disposed within the housing and adjustable radially of the spindle, fluid pressure cylinders carried by the housing and communicating with the oil chamber, valves for controlling the flow of oil from the chamber to the cylinders, pistons operating within the cylinders and provided with longitudinal ports, spring pressed valves carried by the pistons and normally closing said ports, there being a bypass formed in the wall of each cylinder and opening into the cylinder at the opposite ends thereof, relatively stationary and movable raceways carried by the eccentric, anti-friction members interposed between the raceways, bearing shoes carried by the pistons and bearing against the movable raceway, and means operatively connected with the eccentric for adjusting the latter vertically of the spindle whereby to cause the pistons to exert a braking action on the eccentric.

10. In a hydraulic brake, the combination with a wheel spindle, of a housing mounted for rotation on the spindle and having an open front, said housing being provided with a circumferential oil chamber, a hub plate forming a closure for the open front of the housing, a slotted guide plate disposed within the housing and secured to the spindle, an eccentric adjustable radially of the spindle and having a lateral guide member operating in the slot in the guide plate, a movable raceway carried by the eccentric, fluid pressure cylinders mounted on the housing and communicating with the oil chamber, valved pistons operating within the cylinders, spring pressed valves for controlling the flow of fluid from the chamber into the cylinders, bypasses formed in the walls of the cylinders and opening thereinto at the opposite ends thereof, bearing shoes carried by the pistons and bearing against the movable raceway, toggle levers pivotally connected with the spindle and eccentric respectively, and means operatively connected with the toggle levers for operating the same to adjust the eccentric whereby to cause the pistons to exert a braking action on the movable raceway.

11. In a hydraulic brake, the combination with a wheel spindle, of a housing mounted for rotation on the spindle and adapted to support a vehicle wheel, a stationary guide member on the spindle, a movable actuating member coacting with the guide member and normally concentric with the longitudinal axis of the spindle, a raceway carried by the actuating member, fluid pressure cylinders mounted on the housing, valved pistons operating within the cylinders and provided with shoes engaging the raceway, and means interposed between the spindle and actuating member and operatively connected therewith for moving the actuating member to a position eccentric to the spindle whereby to cause the pistons to exert a gripping action on the raceway.

HARRY W. DRAKE. [L. S.]